United States Patent
Roche et al.

(10) Patent No.: US 6,770,730 B1
(45) Date of Patent: Aug. 3, 2004

(54) COMPACT VENEER BASED ON POLYISOCYANATE POLYADDITION PRODUCTS

(75) Inventors: Peter Roche, Emmerling (DE); Thomas Bartz, Olching (DE); Georg Knoblauch, München (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/439,435

(22) Filed: Nov. 15, 1999

(30) Foreign Application Priority Data

Nov. 25, 1998 (DE) ......................................... 198 54 405

(51) Int. Cl.$^7$ .............................................. C08G 18/50
(52) U.S. Cl. ............................. 528/78; 528/76; 528/77
(58) Field of Search ............................... 528/76, 77, 78

(56) References Cited

U.S. PATENT DOCUMENTS

| | | | | |
|---|---|---|---|---|
| 4,263,423 A | * | 4/1981 | Schwindt et al. | 528/55 |
| 4,379,904 A | * | 4/1983 | Ehrlich et al. | 528/65 |
| 4,797,320 A | | 1/1989 | Kopp et al. | 428/316.6 |
| 5,071,683 A | | 12/1991 | Verwilst et al. | 427/420 |
| 5,091,497 A | * | 2/1992 | Grogler et al. | 528/76 |
| 5,233,009 A | * | 8/1993 | Madan et al. | 528/60 |
| 5,354,397 A | * | 10/1994 | Miyake et al. | 156/77 |
| 5,614,575 A | * | 3/1997 | Kotschwar | 524/270 |

\* cited by examiner

Primary Examiner—Rabon Sergent

(74) Attorney, Agent, or Firm—Fernando A. Borrego

(57) ABSTRACT

A compact veneer is based on a reaction mixture comprising
a) isocyanate,
b) as compounds which are reactive toward isocyanates, a mixture (b1) comprising:
  b11) from 15 to 90% by weight, preferably from 50 to 80% by weight, based on the weight of the mixture (b1), of at least one polyether polyalcohol having a molecular weight of from 400 to 6000, preferably from 1000 to 4000 and a mean functionality of from 1.5 to 3 and based on hydroxyl-containing initiator substances and propylene oxide and also, if desired, ethylene oxide,
  b12) from 0 to 20% by weight, preferably from 0 to 10% by weight, based on the weight of the mixture (b1), of at least one polyether polyalcohol having a molecular weight of from 400 to 6000, preferably from 400 to 4000, and a mean functionality of from 1.5 to 3 and based on amino-containing initiator substances and propylene oxide and also, if desired, ethylene oxide,
  b13) from 0 to 35% by weight, preferably from 2 to 15% by weight, based on the weight of the mixture (b1), of at least one polyether polyalcohol having a molecular weight of from 150 to 7000 and a mean functionality of from 2.1 to 5, preferably from 3.1 to 5,
  b14) from 0 to 30% by weight, preferably from 10 to 25% by weight, based on the weight of the mixture (b1), of at least one bifunctional chain extender, plus, if desired,
c) catalysts and/or
d) auxiliaries and/or additives, where the sum of the percentages by weight of the components b11), (b12), (b13) and (b14) is preferably 100% by weight.

11 Claims, No Drawings

COMPACT VENEER BASED ON POLYISOCYANATE POLYADDITION PRODUCTS

The present invention relates to a compact veneer based on a reaction mixture comprising
a) isocyanate,
b) as compounds which are reactive toward isocyanates, a mixture (b1) comprising:
  b11) from 15 to 90% by weight, preferably from 50 to 80% by weight, based on the weight of the mixture (b1), of at least one polyether polyalcohol having a molecular weight of from 400 to 6000, preferably from 1000 to 4000 and a mean functionality of from 1.5 to 3 and based on hydroxyl-containing initiator substances and propylene oxide and also, if desired, ethylene oxide,
  b12) from 0 to 20% by weight, preferably from 0 to 10% by weight, based on the weight of the mixture (b1), of at least one polyether polyalcohol having a molecular weight of from 400 to 6000, preferably from 400 to 4000, and a mean functionality of from 1.5 to 3 and based on amino-containing initiator substances and propylene oxide and also, if desired, ethylene oxide,
  b13) from 0 to 35% by weight, preferably from 2 to 15% by weight, based on the weight of the mixture (b1), of at least one polyether polyalcohol having a molecular weight of from 150 to 7000 and a mean functionality of from 2.1 to 5, preferably from 3.1 to 5,
  b14) from 0 to 30% by weight, preferably from 10 to 25% by weight, based on the weight of the mixture (b1), of at least one bifunctional chain extender, plus, if desired,
c) catalysts and/or
d) auxiliaries and/or additives,
where the sum of the percentages by weight of the components (b11), (b12), (b13) and (b14) is preferably 100% by weight.

Furthermore, the invention relates to a process for producing moldings comprising foamed polyisocyanate polyaddition products and a compact veneer according to the present invention as a skin adhering thereto, such moldings and their use.

Polyisocyanate polyaddition products, usually polyurethanes and/or polyisocyanurates, obtainable by reacting isocyanates with compounds which are reactive toward isocyanates are generally known. A particular embodiment of these products is moldings which have a synthetic skin based on such products laminated onto them. These moldings are usually composite components comprising essentially this veneer and usually a flexible polyurethane foam and possibly a rigid support. These moldings are used, inter alia, in automobile construction where they are employed, for example, as seats, dashboards consoles, glove compartments or as interior or exterior trim, but they are also used in shipbuilding and the construction of vehicles for use in the agricultural and the building and construction sectors.

These moldings are generally produced by laying a thermoplastic film in the foam shell and subsequently deep-drawing this film in the foam shell or by spraying a heat-curable one-component or cold-curing two-component polyurethane liquid film into the appropriate mold and subsequently backfoaming the film with a polyurethane foam in the presence of a rigid support, so that the foam provides a connection between the film and the support. Disadvantages of the use of the deep-drawn film are the scrap resulting from projecting parts of film, the limitations imposed on the design by deep drawing, since surface features such as graining are changed in the stretched zones, and the layer thickness determined by the film. The disadvantages of producing the veneer by spraying the liquid polyurethane systems, as described, for example, in EP-A 275 009 and EP-A 303 305, are the relatively long curing time, the application problems in the case of tight undercuts, the layer thickness which is particularly difficult to set in the case of edges and aerosol formation by the reactive starting components in the workplace. The application of a one-component polyurethane system as described in EP 0275009 also has disadvantages such as an extremely high mold temperature and comparatively little possible variation as regards mechanics and curing behavior of the skin.

It is an object of the present invention to develop veneers having excellent optical and mechanical properties, for example a uniform structure, excellent feel, a high strength and/or high extensibility together with great design freedom. These veneers should, in particular, be suitable for the economical production of moldings which preferably consist of a composite with flexible foams and, if desired, rigid supports and can be used, for example, in automobile construction. Furthermore, the veneer and foam being made of the same material would be an advantage in terms of future recycling or disposal. A further object is to develop reaction mixtures which can be processed without aerosol formation to produce these veneers based on polyisocyanate polyaddition products. The reaction mixture should make it possible to produce the veneer in a mold without a spraying step.

We have found that this object is achieved by the veneers described at the outset.

For the purposes of the present invention, the expression veneers refers to sheet-like, compact bodies which usually have a thickness of from 0.1 to 5 mm. The veneers, which are generally known as (synthetic) skins, usually serve as covering layers of moldings. According to the present invention, preference is given to moldings, also referred to as composite elements, which comprise foamed polyisocyanate polyaddition products, in particular flexible polyurethane foams, and a veneer according to the present invention as a skin adhering thereto. The moldings particularly preferably further comprise rigid supports, for example compact stiffening elements or construction elements, e.g. on the basis of steel, aluminum or customary plastics such as polyurethane.

These moldings according to the present invention are used, inter alia, as seats, dashboards, consoles, glove compartments or interior or exterior trim in, for example, automobile construction. These products comprising the moldings of the present invention have the following advantages:
  high design freedom
  uniform grain
  excellent mechanical properties
  excellent feel
  little production scrap
  lightfast and colored products can be produced without problems
  impermeability to water As regards the starting components present in the reaction mixture according to the present invention, the following may be said, with the examples given for the components (a), (c) and (d) also applying to the polyisocyanate polyaddition products, particularly preferably flexible polyurethane foams, preferably present in the moldings:

As isocyanates (a), it is possible to use generally known (cyclo)aliphatic and/or aromatic polyisocyanates. Particularly suitable isocyanates for producing the composite elements of the present invention are aromatic diisocyanates, preferably diphenylmethane diisocyanate (MDI) and/or tolylene diisocyanate (TDI), and/or polyisocyanates such as polyphenyl polymethylene polyisocyanates. The isocyanates can be used in the form of the pure compound, in mixtures and/or in modified form, for example in the form of uretdiones, isocyanurates, allophanates or biurets, preferably in the form of reaction products, known as isocyanate prepolymers, containing urethane and isocyanate groups.

As compounds (b) which are reactive toward isocyanates, use is made, according to the present invention, of the novel mixture (b1) described at the outset.

The component (b11) can be prepared, for example, by generally known alkoxylation of bifunctional and trifunctional initiator substances, for example ethylene glycol and/or propylene glycol or trimethylolpropane or glycerol, using known alkylene oxides, e.g. ethylene oxide, propylene oxide and/or butylene oxide. The alkylene oxides can be added onto the initiator substance or substances in mixtures or blockwise, e.g. the component (b11) can be end-capped by ethylene oxide.

The component (b12) differs from the component (b11) essentially in the use of the initiator substance. Initiator substances used are ones containing primary and/or secondary amino groups, for example 2-(diethylamino)ethylamine, diethylamino-4-aminopentane, diethylaminopropylamine and/or dimethylaminopropylamine.

As component (b13), use is made of customary polyether polyalcohols which have the characteristics specified according to the present invention. These compounds can be prepared as already described in respect of the component (b11) by known alkoxylation of initiator substances. Initiator substances used are usually ones which contain hydroxyl groups and/or primary and/or secondary amino groups and have a functionality of from 3 to 5, for example trimethylolpropane, glycerol, triethanolamine, dimethylaminopropylamine, pentaerythritol, sucrose, sorbitol, ethylenediamine, propanediamine and/or N,N'-bis(3-aminopropyl)ethylenediamine.

Examples of bifunctional chain extenders (b14) are diols and/or amines, for example ethanediol, propanediol, butanediol, pentanediol, hexanediol and 4-hydroxymethylbenzyl alcohol.

To produce the foamed polyisocyanate polyaddition products which are preferably present in the moldings in addition to the veneers of the present invention, the isocyanate-reactive compounds (b) used can be generally known substances, e.g. polyalcohols such as polycarbonate diols, polyesterols and/or polyetherols, with particular preference being given to the polyetherols because of their higher hydrolysis stability, and/or polyamines. For example, it is possible to use, as (b), the components (b11), (b12), (b13) and (b14) already described for the production of the veneers of the present invention. The polyalcohols usually have a functionality of from 1.5 to 5, in particular from 1.5 to 3, and a molecular weight of from 500 to 10000, in particular from 500 to 7000. Furthermore, it is possible to use chain extenders and/or crosslinkers as (b). The chain extenders are predominantly 2-functional alcohols having molecular weights of from 60 to 499, for example ethylene glycol, propylene glycol, 1,4-butanediol or 1,5-pentanediol. The crosslinkers are compounds having molecular weights of from 60 to 499 and 3 or more active H atoms, preferably amines and particularly preferably alcohols, for example glycerol, trimethylolpropane and/or pentaerythritol. The proportion by weight of the chain extenders and/or crosslinkers is usually from 0 to 20% by weight, based on the total weight of the component (b).

The reaction for producing the veneers and the foamed polyisocyanate polyaddition products is preferably carried out in the presence of catalysts. As catalysts (c), it is possible to use customary compounds which, for example, strongly accelerate the reaction of the component (a) with the component (b). Examples of suitable catalysts are strongly basic amines, e.g. amidines, tertiary amines, for example, 1,4-diazabicyclo[2.2.2]-octane, and/or organic metal compounds, for example iron(III)acetylacetonate and/or, in particular, tin compounds.

The reaction is carried out in the presence or absence of (d) auxiliaries and/or additives such as colorants, fillers, cell regulators, surface-active compounds and/or stabilizers against oxidative, thermal or microbial degradation or aging.

The foamed polyisocyanate polyaddition products which may be present in the moldings according to the present invention in addition to the veneers of the present invention are produced in the presence of blowing agents (e). As blowing agents (e), it is possible to use generally known chemically or physically acting compounds. As chemically acting blowing agent, preference is given to using water which forms carbon dioxide by reaction with the isocyanate groups. Examples of physical blowing agents, i.e. inert compounds which vaporize under the conditions of polyurethane formation, are, for example, (cyclo)aliphatic hydrocarbons, preferably those having from 4 to 8, particularly preferably from 4 to 6 and in particular 5, carbon atoms, partially halogenated hydrocarbons or ethers, ketones or acetates. The amount of blowing agents used depends on the desired density of the foams. The various blowing agents can be used individually or in any mixtures with one another.

To produce the products according to the present invention, the isocyanates (a) and the isocyanate-reactive compounds (b) or (b1) can be reacted in such amounts that the equivalence ratio of NCO groups of (a) to the sum of the reactive hydrogen atoms of (b) or (b1) is preferably 0.95–1.3:1, particularly preferably 1–1.2:1 and in particular 1–1.15:1. If the product is to contain at least some bound isocyanurate groups, it is usual to employ a ratio of NCO groups to the sum of the reactive hydrogen atoms of 1.5–60:1, preferably 1.5–8:1.

The products are usually produced by the known one-shot method or the likewise known prepolymer process.

In the known and preferred prepolymer process, it is usual to prepare a prepolymer containing isocyanate groups from (a) and a deficiency of (b) in a first step and then to react this prepolymer with further (b) to form the desired products.

The starting components, for example the reaction mixture according to the present invention, are usually, depending on the application, mixed at from 0 to 100° C., preferably from 20 to 80° C., and introduced, for example, into the mold. Mixing can, as already indicated, be carried out mechanically by means of a stirrer or a stirring screw or in a customary high-pressure mixing head.

It has been found to be advantageous for the components for producing compact polyisocyanate polyaddition products to be degassed before and during processing by application of a vacuum (1–759 torr) in order to obtain bubble-free moldings.

The reaction to form the product can be carried out, for example, by manual casting, by means of high-pressure or low-pressure machines, or by RIM (reaction injection molding) methods, usually in open or preferably closed molds. Suitable PU processing machines are commercially available (e.g. Fa. Elastogran, Isotherm, Hennecke, Kraus Maffei, etc.).

The reaction of the reaction mixture is advantageously carried out in customary, preferably heatable and closable, molds. Particularly in the production of very smooth products, molds used are preferably ones whose surface is very smooth or is ornamented in a defined way and preferably has no unevenness, cracks, scratches or contamination. The surface of this mold can be treated, for example, by polishing.

As molds for producing the products, it is possible to use customary and commercially available molds whose surface comprises, for example, steel, aluminum, enamel, Teflon, epoxy resin or other polymeric material, with the surface being able to be, if desired, chrome-plated, for example hard-chrome-plated, or provided with other electrodeposited coatings. The molds are preferably heatable so that the preferred temperatures can be set, closable and preferably equipped for applying a pressure to the product.

The veneers of the present invention can be produced, for example, by pouring the starting components, for example the reaction mixture, into an open mold or by injection into a closed mold. The reaction mixture comprising the starting components is preferably distributed uniformly in the mold so that veneers having a substantially uniform thickness can be obtained. This can be achieved, for example, by pouring the reaction mixture into a mold and subsequently rotating the mold to distribute the reaction mixture preferably uniformly on the inner surface of the mold or manually distributing the reaction mixture in the mold, for example by means of a brush. The disadvantages usually caused by spraying the reactive components as a result of spraying from above or spraying over the sealing edges of the mold can thus be avoided. The reaction mixture is preferably not introduced into the mold by spraying.

The reaction to form the polyisocyanate polyaddition products is usually carried out at a mold temperature, preferably also a temperature of the starting components, of from 20 to 220° C., preferably from 40 to 120° C., particularly preferably from 50 to 100° C., for a time of usually from 0.2 to 30 minutes, preferably from 0.3 to 5 minutes.

The veneers of the present invention can be processed to produce the above-described moldings. This is usually carried out by producing the veneer of the present invention in a mold in a first step and subsequently producing a foamed polyisocyanate polyaddition product by reaction of a reaction mixture comprising (a) isocyanates, (b) compounds which are reactive toward isocyanates, (e) blowing agents and, if desired, (c) catalysts, (d) auxiliaries and/or additives in contact with the surface of the veneer in a mold, preferably in the same mold. For the second reaction, the veneer can be transferred into a further mold or else be further processed to the molding in the same mold, for example by replacing the mold lid. The backfoaming of the veneer is preferably carried out in the presence of rigid supports, for example stiffening elements or construction elements. The foam produced according to this preferred embodiment adheres very well both to the veneer and to any supports which may be present.

The invention is illustrated by the following examples.

EXAMPLE 1

432 g of 4,4'-MDI and 73 g of uretdione-modified 4,4'-MDI (Lupranat® MM 103 from BASF Aktiengesellschaft) were heated to 60° C. while stirring. 495 g of a bifunctional polyoxypropylene oxide having a mean molecular weight of 2000 g/mol (Lupranol® 1000 from BASF Aktiengesellschaft) were subsequently added and the reaction mixture was heated to 80° C. while stirring. After this temperature had been reached, the mixture was stirred for another 90 minutes. The resulting prepolymer had an NCO content of 14.4% by weight and a viscosity at 25° C., determined in accordance with DIN 53018, of 1000 mPas. To produce the cast skin, the prepolymer was mixed with a mixture of 86% by weight of polytetramethylene glycol (PolyTHF 2000 from BASF Aktiengesellschaft) having a molecular weight of 2000, 13.5% by weight of 1,4-butanediol and 0.5% by weight of amine catalyst Lupragen® N 201 from BASF Aktiengesellschaft (10% strength in dipropylene glycol) at 50° C. in an equimolar weight ratio of polyol component:isocyanate component using a high-pressure machine. The mechanical properties of the resulting cast elastomer are shown in the table.

EXAMPLE 2

437 g of 4,4'-MDI and 73 g of uretdione-modified 4,4'-MDI (Lupranat® MM 103 from BASF Aktiengesellschaft) were heated to 60° C. while stirring. 490 g of a bifunctional polyoxypropylene oxide having an ethylene oxide end cap and a mean molecular weight of 4000 g/mol (Lupranol® 2043 from BASF Aktiengesellschaft) were subsequently added and the reaction mixture was heated to 80° C. while stirring. After this temperature had been reached, the mixture was stirred for another 90 minutes. The resulting prepolymer had an NCO content of 15.3% by weight and a viscosity at 25° C., determined in accordance with DIN 53018, of 700 mPas. To produce the cast skin, the prepolymer was mixed with a mixture of 85.5% by weight of a trifunctional polyoxypropylene oxide initiated using trimethylolpropane, having an ethylene oxide end cap and having a mean molecular weight of about 6000 g/mol (Lupranol® 2042 from BASF Aktiengesellschaft), 14% by weight of a trifunctional polypropylene glycol initiated using trimethylolpropane and having a mean molecular weight of about 200 g/mol (Lupranol® 3901 from BASF Aktiengesellschaft) and 0.5% by weight of amine catalyst Lupragen® N 201 from BASF Aktiengesellschaft (10% strength in dipropylene glycol) at 50° C. in an equimolar weight ratio of polyol component:isocyanate component using a high-pressure machine. The mechanical properties of the resulting cast elastomer are shown in the table.

EXAMPLE 3

530 g of partially trimerized isophorone diisocyanate (Vestanat 6040 from Büls AG) were heated to 60° C. while stirring. 470 g of a bifunctional polyoxypropylene oxide having a mean molecular weight of 2000 g/mol (Lupranol® 1000 from BASF Aktiengesellschaft) were subsequently added and the reaction mixture was heated to 80° C. while stirring. After this temperature had been reached, the mixture was stirred for another 120 minutes. The resulting prepolymer had an NCO content of 14.1% by weight and a viscosity at 25° C., determined in accordance with DIN 53018, of 1600 mPas. To produce the cast skin, the prepolymer was mixed with a mixture of 71.5% by weight of a trifunctional polyoxypropylene oxide initiated using trimethylolpropane, having an ethylene oxide end cap and having a mean molecular weight of about 6000 g/mol (Lupranol® 2042 from BASF Aktiengesellschaft), 10% by weight of a bifunctional, amine-initiated polypropylene glycol having a mean molecular weight of about 450 g/mol, 18% by weight of 1,4-butanediol and 0.5% of an organic tin catalyst (Fomrez UL 28 from Witco) at 50° C. in an equimolar weight ratio of polyol component:isocyanate component using a high-pressure machine. The mechanical properties of the resulting cast elastomer are shown in the table.

TABLE

Mechanical properties of the veneers of the present invention

|  | Example 1 | Example 2 | Example 3 |
|---|---|---|---|
| Shore A hardness | 79 | 73 | 50 |
| Tensile strength [MPa] | 32 | 10 | 10 |
| Elongation at break [%] | 640 | 150 | 400 |
| Tear propagation resistance [N/mm] | 30 | 10 | 15 |

These products according to the present invention have the following advantages:
high design freedom
uniform grain
excellent mechanical properties
excellent feel
little production scrap
impermeability to water

We claim:

1. A veneer made from a reaction mixture comprising:
a) an isocyanate,
b) a mixture (b1) of isocyanate-reactive compounds comprising:
   b11) from 15 to 90% by weight, based on the weight of the mixture (b1), of a first polyether polyalcohol, said first polyether polyalcohol comprising a hydroxyl functional initiator and propylene oxide, having a number average molecular weight of from 400 to 6000 and a mean functionality of from 1.5 to 3;
   b12) from a positive amount to 20% by weight, based on the weight of the mixture (b1), of a second polyether polyalcohol, said second polyether polyalcohol comprising an amine functional initiator and propylene oxide, having a number average molecular weight of from 400 to 6000 and a mean functionality of from 1.5 to 3;
   b13) from 2 to 15% by weight, based on the weight of the mixture (b1), of a third polyether polyalcohol having a number average molecular weight of from 150 to 7000 and a mean functionality of from 2.1 to 5;
   b14) from a positive amount to 30% by weight, based on the weight of the mixture (b1), of a bifunctional chain extender; and, optionally,
c) catalysts and/or;
d) auxilaries and/or additives;
wherein said chain extender, said first, said second and said third polyether polyalcohols are mutually exclusive of and structurally distinct from each other, and wherein the percentages by weight of components b11, b12, b14, and b13 total 100% of b1.

2. A process for producing compact veneers, which comprises reacting a reaction mixture as claimed in claim 1 in a mold.

3. A veneer as recited in claim 1, wherein said first polyether polyalcohol has a number average molecular weight of from 1000 to 4000.

4. A veneer as recited in claim 1, wherein said mixture (b1) comprises from 50 to 80% by weight of said first polyether polyalcohol.

5. A veneer as recited in claim 1, wherein said second polyether polyalcohol has a number average molecular weight of from 400 to 4000.

6. A veneer as recited in claim 1, wherein said mixture (b1) comprises from a positive amount to 10% by weight of said second polyether polyalcohol.

7. A veneer as recited in claim 1, wherein said third polyether polyalcohol has a mean functionality of from 3.1 to 5.

8. A veneer as recited in claim 1, wherein said mixture (b1) comprises from 10 to 25% by weight of said bifunctional chain extender.

9. A veneer as Kited in claim 1, wherein said first polyether polyalcohol further comprises ethylene oxide.

10. A veneer as recited in claim 1, wherein said second polyether polyalcohol further comprises ethylene oxide.

11. A veneer as recited in claim 1, wherein said third polyether polyalcohol comprises ethylene oxide.

* * * * *